United States Patent [19]
Shen et al.

[11] 3,903,095
[45] Sept. 2, 1975

[54] CERTAIN SUBSTITUTED-THIENO[3,2-C]-PYRIDINES

[75] Inventors: Tsung-Ying Shen, Westfield; Robert L. Clark, Woodbridge, both of N.J.

[73] Assignee: Merck & Co., Inc., Rahway, N.J.

[22] Filed: Oct. 23, 1973

[21] Appl. No.: 408,349

Related U.S. Application Data

[62] Division of Ser. No. 227,612, Feb. 18, 1972, Pat. No. 3,845,065.

[52] U.S. Cl............ 260/294.8 C; 424/263; 424/266
[51] Int. Cl.$^2$....................................... C07D 213/32
[58] Field of Search ............................ 260/294.8 C

[56] References Cited
OTHER PUBLICATIONS

Eloy et al., Chem. Abstracts, Vol. 73 (21) pp. 366, 109, 722v, Nov. 23, 1970.

Deryckere et al., Chem. Abstracts, Vol. 73 (23), pp. 381–382, 120, 639u, Dec. 7, 1970.

*Primary Examiner*—Alan L. Rotman
*Attorney, Agent, or Firm*—Stanley E. Anderson, Jr.; Mario A. Monaco; Harry E. Westlake, Jr.

[57] ABSTRACT

Novel substituted-thieno[3,2-c]-pyridines as anti-inflammatory, anti-pyretic, analgesic and tranquilizing agents. Also included herein are pharmaceutical compositions containing said thieno[3,2-c]-pyridine compounds as an active ingredient, and methods of treating inflammation, fever, emotional disorders and pain in patients by administering said compounds. Further encompassed are 4-oxo-4,5-dihydrothieno[3,2-c]-pyridine and 4-chloro-4,5-dihydrothieno[3,2-c]-pyridine, possessing novel anti-inflammatory, anti-pyretic, tranquilizing and analgesic activities.

7 Claims, No Drawings

CERTAIN SUBSTITUTED-THIENO[3,2-C]-PYRIDINES

CROSS REFERENCE TO RELATED APPLICATIONS

This is a division of application Ser. No. 227,612, filed Feb. 18, 1972 now U.S. Pat. No. 3,845,065, dated Oct. 29, 1974.

This invention relates to novel substituted thieno[3,2-c]-pyridines and methods for preparing the same. Also included within the scope of the invention are pharmaceutical compositions containing said thieno[3,2-c]-pyridine compounds as active ingredients. The novel thieno[3,2-c]-pyridines of the invention are potent anti-inflammatory, anti-pyretic, tranquilizing and analgesic agents which are effective in the method of counteracting inflammation, emotional disorders, pain and fever.

Numerous compounds have been widely used in the treatment of inflammation, emotional disorders, pain and fever during the past decade. The compounds employed in said treatment have consisted of both steroids and non-steroids. These compounds have shown side effects ranging from a simple headache to psychic and gastrointestinal disturbances.

In a continuous search for potent anti-inflammatory, anti-pyretic, tranquilizing and analgesic agents, we have found a class of novel thieno[3,2-c]-pyridines which are highly effective in the treatment of inflammation, pain, emotional disorders and fever. The novel thieno[3,2-c]-pyridines are of value in the treatment of arthritic and dermatological disorders of like conditions responsive to anti-inflammatory drugs. In general, they are indicated for a wide variety of conditions where one or more of the symptoms of inflammation, fever, emotional disorders (anxiety, dissociative, conversion, phobic, depressive and obsessive compulsive) and pain are manifested. Included within this category are diseases such as rheumatoid arthritis, osteoarthritis, gout, infectious arthritis and rheumatic fever. As indicated above, the compounds utilized in the practice of the invention also possess a useful degree of analgesic, tranquilizing and anti-pyretic activity.

Further encompassed within the scope of the invention are 4-oxo-4,5-dihydrothieno[3,2-c]-pyridine and 4-chloro-4,5-dihydrothieno[3,2-c]-pyridine, compounds known to the art [Bull. Soc. Chim. Belges 79 407–414 (1970) and Chemical Abstracts 73 120639 U (1970)] but having no disclosed pharmaceutical utility. These known compounds have unexpectedly been found to possess potent anti-inflammatory, anti-pyretic, tranquilizing and analgesic activities.

The novel thieno[3,2-c]-pyridine compounds of the invention are represented by the general structure below:

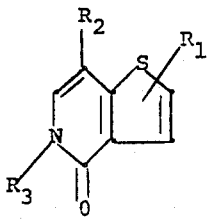
(I)

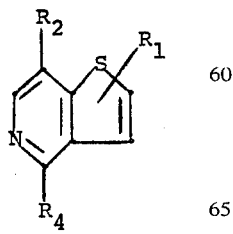
(II)

wherein
$R_1$ and $R_2$ are each
hydrogen,
halogen, such as
fluorine,
bromine and the like,
alkoxy, such as
methoxy,
ethoxy,
isopropyloxy,
butoxy and the like,
nitrile,
hydroxy,
nitro,
amino,
hydroxyalkyl, such as
hydroxymethyl,
hydroxyethyl,
hydroxypropyl and the like,
alkyl, such as
methyl,
propyl,
ethyl,
t-butyl and the like,
dialkylamino, such as
dimethylamino,
diethylamino,
methylethylamino and the like,
dialkenylamino, such as
dibutenylamino,
dipentenylamino,
dipropenylamino and the like,
alkylamino, such as
methylamino,
ethylamino,
butylamino and the like,
arylamino, such as
anilino,
o,m or p-tolylamino,
anisidino and the like,
aralkylamino, such as
benzylamino,
phenethylamino,
o,m or p-methoxybenzylamino,
o,m or p-halobenzylamino,
heterocyclicamino, such as
piperidino,
morpholino,
methylpiperazinyl,
pyrrolidino,
azepino and the like,,
alkenylamino, such as
butenylamino,
propenylamino and the like,
aroyl, such as
benzoyl,
o,m or p-halobenzoyl,
o,m or p-methylthiobenzoyl,
aroylamino, such as
benzoylamino,
o,m or p-halobenzoylamino,
o,m or p-methoxybenzoylamino,
o,m or p-methylthiobenzoylamino, acylamino, such as
  acetylamino,
  propionylamino,
  butyrylamino and the like,
acyl, such as
  acetyl,
  propionyl,
  butyryl and the like,
mercapto,
alkylthio, such as
  methylthio,
  ethylthio,
  butylthio and the like,
arylthio, such as
  phenylthio,
  o,m or p-tolylthio and the like,
aralkylthio, such as
  benzylthio,
  o,m or p-methylbenzylthio,
  o,m or p-methoxybenzylthio,
  phenethylthio and the like,
alkenylthio, such as
  butenylthio,
  propenylthio and the like,
alkylsulfoxide, such as
  methylsulfoxide,
  ethylsulfoxide,
  propylsulfoxide and the like,
alkenylsulfoxide, such as
  allylsulfoxide and the like,
arylsulfoxide, such as
  phenylsulfoxide,
  o,m or p-tolylsulfoxide and the like,
aralkylsulfoxide, such as
  benzylsulfoxide,
  phenethylsulfoxide and the like,
alkylsulfone, such as
  methylsulfone,
  ethylsulfone,
  isopropylsulfone,
  butylsulfone and the like,
alkenylsulfone, such as
  butenylsulfone,
  propenylsulfone and the like,
arylsulfone, such as
  phenylsulfone,
  o,m or p-tolylsulfone and the like,
aralkylsulfone, such as
  benzylsulfone,
  phenethylsulfone,
  o,m or p-methylbenzylsulfone and the like,
carbamoyl,
mono- or dialkylcarbamoyl, such as
  methylcarbamoyl,
  dimethylcarbamoyl,
  diethylcarbamoyl,
  butylcarbamoyl and the like,
arylcarbamoyl, such as
  phenylcarbamoyl,
  anisidinocarbamoyl and the like,
aralkylcarbamoyl, such as
  benzylcarbamoyl,
  o,m or p-methylbenzylcarbamoyl,
  phenethylcarbamoyl and the like,
mono- or dialkenylcarbamoyl, such as
  propenylcarbamoyl,
  butenylcarbamoyl;
  pentenylcarbamoyl,
  dipropenylcarbamoyl and the like,
amidino,
ureido,
carbamoyloxy,
N-alkylcarbamoyloxy, such as
  N-methylcarbamoyloxy,
  N-ethylcarbamoyloxy,
  N-isopropylcarbamoyloxy,
  N-butylcarbamoyloxy and the like,
N-dialkylcarbamoyloxy, such as
  N-dimethylcarbamoyloxy,
  N-diethylcarbamoyloxy,
  N-dibutylcarbamoyloxy and the like,
haloalkyl, such as
  difluoromethyl,
  fluoromethyl,
  trifluoromethyl,
  trichloromethyl,
  bromomethyl,
  chloromethyl,
  tribromoethyl and the like,
sulfamoyl,
alkylsulfamoyl, such as
  methylsulfamoyl,
  ethylsulfamoyl,
  isopropylsulfamoyl,
  butylsulfamoyl and the like,
dialkylsulfamoyl, such as
  dimethylsulfamoyl,
  diethylsulfamoyl,
  methylethylsulfamoyl,
  di-isopropylsulfamoyl and the like,
haloalkoxy, such as
  trifluoromethoxy,
  difluoromethoxy,
  dibromoethoxy,
  dichloromethoxy,
  trifluoroethoxy,
  fluoromethoxy and the like,
haloalkylthio, such as
  trifluoromethylthio,
  difluoromethylthio,
  fluoromethylthio,
  bromomethylthio,
  dichloroethylthio,
  trifluoroethylthio and the like,
alkenyloxy, such as
  propenyloxy,
  ethenyloxy and the like,
aryloxy, such as
  phenoxy,
  o,m or p-halophenoxy,
  o,m or p-tolyloxy,
  o,m or p-methoxyphenoxy and the like,
aralkyloxy, such as
  benzyloxy,
  phenethyloxy,
  o,m or p-methoxybenzyloxy,
  o,m or p-methylbenzyloxy and the like,
carboxy,
carboxyalkyl, such as
  carboxymethyl,
  α-carboxyethyl and the like,
carboxyalkenyl, such as
  α-carboxy(ethylidenyl),
  α-carboxy(butenyl) and the like, alkylaminoalkyl, such as
ethylaminoethyl,
   methylaminomethyl,
   methylaminopropyl,
   butylaminomethyl,
   isopropylaminomethyl and the like,
dialkylaminoalkyl, such as
   diethylaminoethyl,
   methylethylaminomethyl,
   dibutylaminoethyl,
   dimethylaminoethyl,
   diethylaminobutyl and the like,
alkylaminoalkylamino, such as
   ethylaminomethylamino,
   methylaminoethylamino,
   propylaminoethylamino,
   isopropylaminomethylamino,
   butylaminopentylamino and the like,
dialkylaminoalkylamino, such as
   diethylaminomethylamino,
   dimethylaminoethylamino,
   methylisopropylaminoethylamino,
   butylethylaminomethylamino,
   dimethylaminopropylamino and the like,
aralkylaminoalkyl, such as
   benzylaminomethyl
   phenethylaminoethyl,
   o,m or p-methoxybenzylaminomethyl,
   o,m or p-halobenzylaminopropyl,
   o,m or p-methylbenzylaminomethyl and the like,
diaralkylaminoalkyl, such as
   dimethoxybenzylaminomethyl,
   dibenzylaminoethyl,
   dihalobenzylaminopropyl,
   diphenethylaminomethyl and the like,
aralkylaminoalkylamino, such as
   benzylaminomethylamino,
   phenethylaminoethylamino,
   o,m or p-methylbenzylaminomethylamino,
   o,m or p-methoxybenzylaminopropylamino and the like,
diaralkylaminoalkylamino, such as
   dibenzylaminomethylamino,
   diphenethylaminoethylamino,
   benzylphenethylaminopropylamino,
   di- o,m or p-methylbenzylaminobutylamino, and the like,
haloalkyl, such as
   bromomethyl,
   chloroethyl,
   fluoropropyl,
   bromoethyl and the like,
halocarbonyl, such as
   chlorocarbonyl,
   bromocarbonyl,
   fluorocarbonyl and the like,
arylaminoalkyl, such as
   anilinomethyl,
   anisidinoethyl,
   o,m or p-tolylaminomethyl,
   o,m or p-haloanilinopropyl and the like,
diarylaminoalkyl, such as
   diphenylaminomethyl,
   di- o,m or p-tolylaminoethyl,
   di- o,m or p-halophenylaminopropyl,
   di- o,m or p-methoxyphenylaminomethyl and the like, arylaminoalkylamino, such as
   anilinomethylamino,
   anisidinoethylamino,
   o,m or p-tolyaminoethylamino,
   o,m or p-halophenylaminopropylamino, and the like,
diarylaminoalkylamino, such as
   diphenylaminomethylamino,
   phenyl- o,m or p-tolylaminoethylamino,
   o,m or p-halophenyl-o,m or p-methoxyphenylaminopropylamino and the like,
alkyl, aralkyl or phenyl xanthylalkyl radical capable of forming a bis substituent, such as
   methylxanthylmethyl,
   ethylxanthylpropyl,
   isopropylxanthylmethyl,
   phenylxanthylmethyl,
   phenylxanthylpropyl,
   benzylxanthylmethyl and the like;
aryloxycarbonylalkyl, such as
   phenoxycarbonylmethyl,
   o,m or p-tolyloxycarbonylethyl,
   o,m or p-methoxyphenoxycarbonylpropyl,
   o,m or p-halophenoxycarbonylbutyl and the like,
aralkyoxycarbonylalkyl, such as
   benzyloxycarbonylmethyl,
   phenethoxycarbonylpropyl,
   o,m or p-aminobenzyloxycarbonylbutyl,
   o,m or p-halophenoxycarbonylmethyl and the like,
arylcarbonylalkyl, such as
   phenylcarbonylmethyl,
   phenylcarbonylethyl,
   o,m or p-halophenylcarbonylmethyl and the like,
aralkylcarbonylalkyl, such as
   benzylcarboylmethyl,
   benzylcarbonylethyl,
   phenethylcarbonylpropyl and the like,
alkylcarbonylalkyl, such as
   methylcarbonylmethyl,
   ethylcarbonylpropyl,
   propylcarbonylbutyl,
   methylcarbonylethyl and the like,
alkoxycarbonylalkyl, such as
   methoxycarbonylmethyl,
   ethoxycarbonylpropyl,
isopropoxycarbonylbutyl,
   butoxycarbonylpentyl and the like,
$R_3$ is hydrogen,
   alkyl, such as
      methyl,
      ethyl,
      propyl and the like,
   aralkyl, such as
      benzyl,
      o,m or p-methylbenzyl,
      phenethyl,
      o,m or p-methoxybenzyl and the like,
   aryl, such as
      phenyl,
      o,m or p-tolyl,
      o,m or p-methoxyphenyl and the like,
   acyl, such as
      acetyl,
      propionyl,
      butyryl and the like, aroyl, such as
    o,m or p-halobenzoyl,
    benzoyl and the like,
alkoxyalkyl, such as
    methoxymethyl,
    methoxyethyl,
    propyloxymethyl and the like,
aminoalkyl, such as
    aminoethyl,
    aminopropyl,
    aminobutyl and the like,
carboxyalkyl, such as
    carboxymethyl,
    carboxyethyl,
    carboxypropyl,
    carboxybutyl and the like,
hydroxyalkyl, such as
    hydroxymethyl,
    hydroxyethyl,
    hydroxybutyl and the like,
alkenyl, such as
    propenyl,
    butenyl and the like,
alkoxycarbonyl, such as
    methoxycarbonyl,
    ethoxycarbonyl,
    isopropyloxycarbonyl and the like,
carbamoyl,
carboxyalkoxy, such as
    carboxymethoxy,
    carboxyethoxy,
    carboxyisopropyloxy and the like,
mercaptoalkyl, such as
    mercaptomethyl,
    mercaptoethyl,
    mercaptoisopropyl,
    mercaptobutyl and the like,
alkylthioalkyl, such as
    methylthiomethyl,
    methylthioethyl,
    ethylthiomethyl,
    ethylthioethyl,
    isopropylthioethyl and the like,
aralkylthioalkyl, such as
    benzylthioethyl,
    o,m or p-methylbenzylthioethyl,
    o,m or p-methoxybenzylthiomethyl,
    phenethylthioethyl,
    benzylthiomethyl and the like,
aralkylsulfinylalkyl, such as
    benzylsulfinylethyl,
    phenethylsulfinylethyl,
    o,m or p-methylbenzylsulfinylmethyl,
    o,m or p-methoxybenzylsulfinylethyl,
    o,m or p-halobenzylsulfinylethyl,
    o,m or p-aminobenzylsulfinyl and the like;
$R_4$ is hydrogen,
    amino,
    halogen, such as
        chlorine,
        fluorine,
        bromine and the like;
    alkoxy, such as
        methoxy,
        propoxy,
        butoxy,
        isopropoxy,
        ethoxy and the like;
    aralkyloxy, such as
        benzyloxy,
        phenethyloxy,
        o,m or p-methylbenzyloxy,
        o,m or p-methoxybenzyloxy,
        o,m or p-halobenzyloxy and the like,
    heterocyclicamino, such as
        piperidino,
        morpholino,
        methylpiperazinyl,
        pyrrolidino,
        azepino and the like, and
    aryloxy, such as
        phenoxy,
        o,m or p-tolyloxy,
        o,m or p-methoxyphenoxy,
        o,m or p-halophenoxy and the like; with the following provisos:
1. When $R_3$ is hydrogen, at least one of $R_1$ and $R_2$ are other than hydrogen.
2. When $R_4$ is halogen, $R_2$ is other than halogen and hydrogen.
3. When $R_1$ is halogen in the 2-position of the thienopyridine nucleus of Formula I, at least one of $R_2$ and $R_3$ are other than hydrogen.
4. When $R_1$ is halogen in the 2-position of the thienopyridine nucleus in Formula II, $R_2$ is other than hydrogen or $R_4$ is other than chlorine.
5. When $R_2$ is halogen, at least one of $R_1$ and $R_3$ are other than hydrogen.

One preferred embodiment of the invention is a compound of the formula:

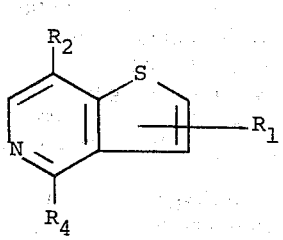

wherein
$R_1$ is hydrogen or halogen;
$R_2$ is hydrogen, halogen, methoxycarbonyl, ethoxycarbonyl, isopropoxycarbonyl, phenylcarbamoyl, anisidinocarbamoyl, hydroxymethyl, hydroxyethyl, hydroxypropyl, carboxymethyl, α-carboxyethyl, carbamoyl or carboxy; and
$R_4$ is hydrogen, halogen, methoxy, ethoxy, isopropoxy, butoxy, benzyloxy, phenethyloxy, o-, m-, or p-methoxybenzyloxy, o-, m-, or p-methylbenzyloxy, carbamoyl, or amino, with the following provisos: (1) when $R_4$ is halogen or alkoxy, $R_2$ is other than halogen and hydrogen; and (2) when $R_1$ is halogen in the 2-position of the thienopyridine nucleus, $R_2$ is other than hydrogen or $R_4$ is other than chlorine.

This invention may be better understood from the details shown below.

The novel compounds of the invention are prepared by employing 7-bromo-4-oxo-4,5-dihydrothieno[3,2-c]-pyridine wherein X is 0 or 7-bromo-2 or 3-halo-4,5-dihydrothieno[3,2-c]pyridine wherein X is 1 (A) as the starting material. Said starting material (A) is treated with a cyano-forming reagent to obtain the corresponding 7-cyano 4-oxo-4,5-dihydrothieno [3,2 c]-pyridine (B). The cyano substituent of the compound thus obtained is hydrolyzed to obtain the corresponding 7-carboxy-4-oxo-4,5-dihydrothieno[3,2-c]-pyridine (C). This carboxy compound is then treated with an acid halide-forming reagent whereby there is obtained the 7-acid halide-4-halothieno[3,2-c]-pyridine (D). Treating the compound thus obtained with a reducing agent yields the corresponding 7-hydroxyalkyl-4-halo-thieno[3,2-c]-pyridine (E). This compound is then treated with a halogenating reagent to obtain the corresponding 7-haloalkyl-4-halothieno[3,2-c]-pyridine (F). Treating this compound with an alkyl, aryl or aralkylxanthylalkyl-forming reagent yields the corresponding 7-alkyl, aralkyl or arylxanthylalkyl-4-halo-thieno[3,2-c]-pyridine (G). The xanthyl compound (G) is then treated with a bis sulfide-forming reagent to obtain the corresponding bis 4-halo-7-thioalkyl-thieno[3,2-c]-pyridine (H).

Compound (D), 7-chlorocarbonyl-4-halothieno[3,2-c]-pyridine is treated with a carbamoyl-forming reagent to obtain the corresponding 7-carbamoyl-thieno[3,2-c]-pyridine (I). Said carbamoyl compound (I) is then treated with an amino-forming reagent to obtain the corresponding compound, 7-carbamoyl-4-aminothieno[3,2-c]-pyridine (J). Also, compound (D) can be treated either with an alkoxy, aryloxy or aralk-yloxy-forming reagent to obtain the corresponding 7-alkoxycarbonyl, aryloxycarbonyl or aralkyloxycarbonylthieno[3,2-c]-pyridine (D'); an amideforming reagent to obtain the corresponding 7-alkylcarbamoyl aralkylcarbamoyl or arylcarbamoylthieno[3,2-c]-pyridine (K); or a hydrolyzing reagent to obtain the corresponding 7-carboxythieno[3,2-c]-pyridine (C').

Compound (B), 7-cyano-4-oxo-4,5-dihydro-thieno[3,2-c]-pyridine, is treated with a halogenating reagent to obtain the corresponding 7-cyano- 2 or 3-halothieno-[3,2-c]-pyridine (A'). The 2 or 3-halo substituent of the compound thus obtained is then converted to the corresponding 2 or 3-cyanothieno[3,2-c]-pyridine (B'). Also, compound (B) can be treated with an $R_3$ substituent to obtain the corresponding 7-cyano-5-$R_3$ 4-oxo-4,5 dihydrothieno[3,2-c]-pyridine (Z).

Starting material (A), 7-bromo-4-oxo-4,5 dihydrothieno[3,2-c]-pyridine, is treated with a halo-forming reagent to obtain 7-bromo-4-halothieno-[3,2-c]-pyridine (R). This compound (R) is then treated either with an alkoxy, aryloxy or aralkyloxy-forming reagent to obtain the corresponding 4-alkoxy, aryloxy or aralk-yloxythieno[3,2-c]-pyridine (W or Y); or an amino-forming reagent to obtain the corresponding 4-aminothieno[3,2-c]-pyridine (X). Treating starting material (A) with an alkoxycarbonylalkyl, aralkoxycarbonylalkyl or arloxycarbonylalkyl-forming reagent yields the corresponding 4-alkoxycarbonylalkyl, aralkoxycarbonylalkyl or aryloxycarboxylalkylthieno[3,2-c]-pyridine (V). Compound (U), 7-bromo-2or 3-halo-4-oxo-4,5-dihydrothieno[3,2-c]-pyridine, is obtained by treating compound (A), 7-bromo-4-oxo-4,5-dihydro-thieno[3,2-c]-pyridine, with a halogenating reagent. To obtain 7-bromo-4-oxo-5-alkylcarbonylalkyl, aralkylcarbonylalkyl or arylcarbonylalkylthieno-[3,2-c]-pyridine (T), compound (A) is treated with an alkylcarbonylalkyl, aralkylcarbonylalkyl or arylcarbonylalkyl-forming reagent. Treating compound (A) with an unsubstituted or substituted-mono- or disubstitutedamino-alkylamino yields the corresponding 7-amino-4-oxo-4,5-dihydrothieno[3,2-c](S). Also, treating compound (A), 7-bromo-4-oxo-4,5-dihydro-thieno[3,2-c]-pyridine with either an $R_3$-forming reagent, an alkylthio, arylthio or aralkylthio-forming reagent, or an unsubstituted or substituted-amino-forming reagent, there is obtained the corresponding 7-bromo-4-oxo-5-$R_3$-4,5-dihydrothieno[3,2-c]-pyridine (Q); 7-alkylthio, aralkylthio or arylthio-4-oxo-4,5-dihydro-thieno[[3,2-c]-pyridine (P); or 7-substituted or unsubstituted-amino-4-oxo-4,5-dihydrothieno[3,2-c]-pyridine (O & N), respectively.

To obtain 4-oxo-5$R_3$-4,5-dihydrothieno[3,2-c]-pyridine (M), compound (A) is dehalogenated to yield 4-oxo-4,5-dihydrothieno[3,2-c]-pyridine (L), which is then treated with an $R_3$-forming reagent to obtain the product (M).

Flow Sheet I represents the general sequence for the preparation of the novel compounds of the invention.

FLOW SHEET I
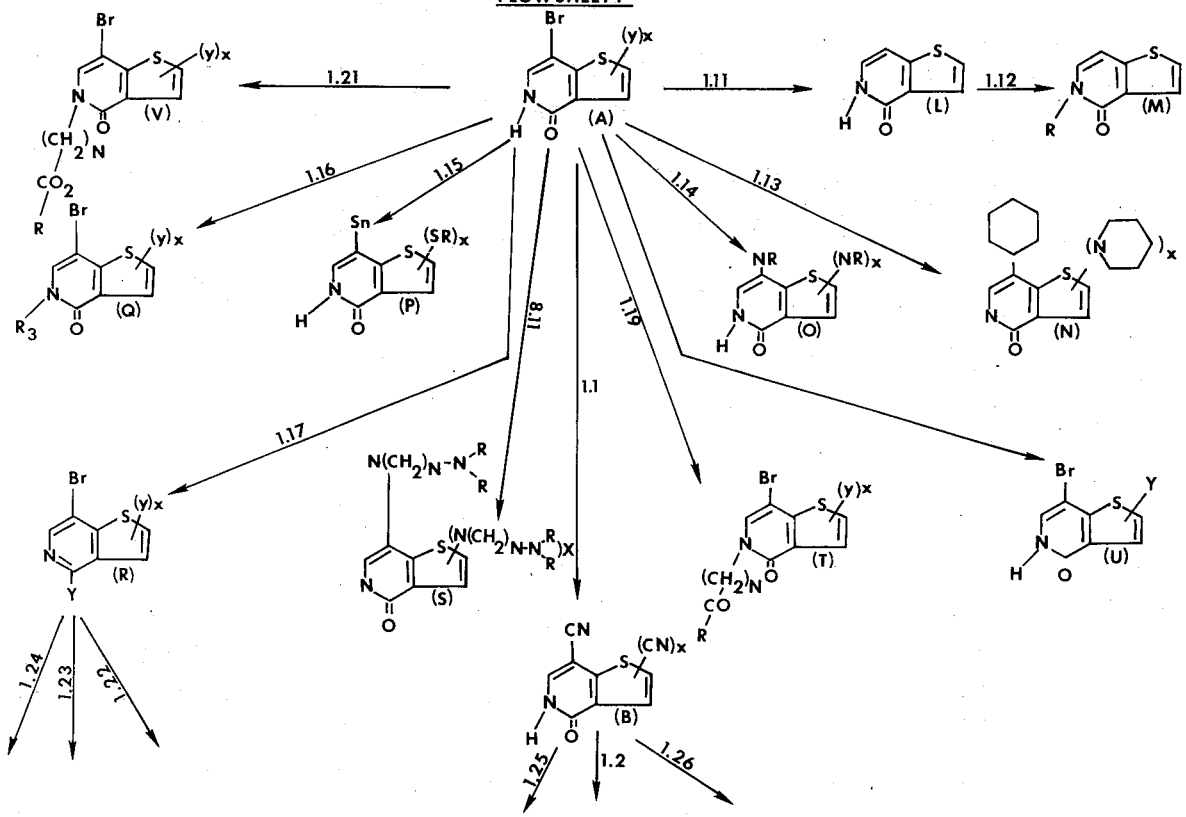
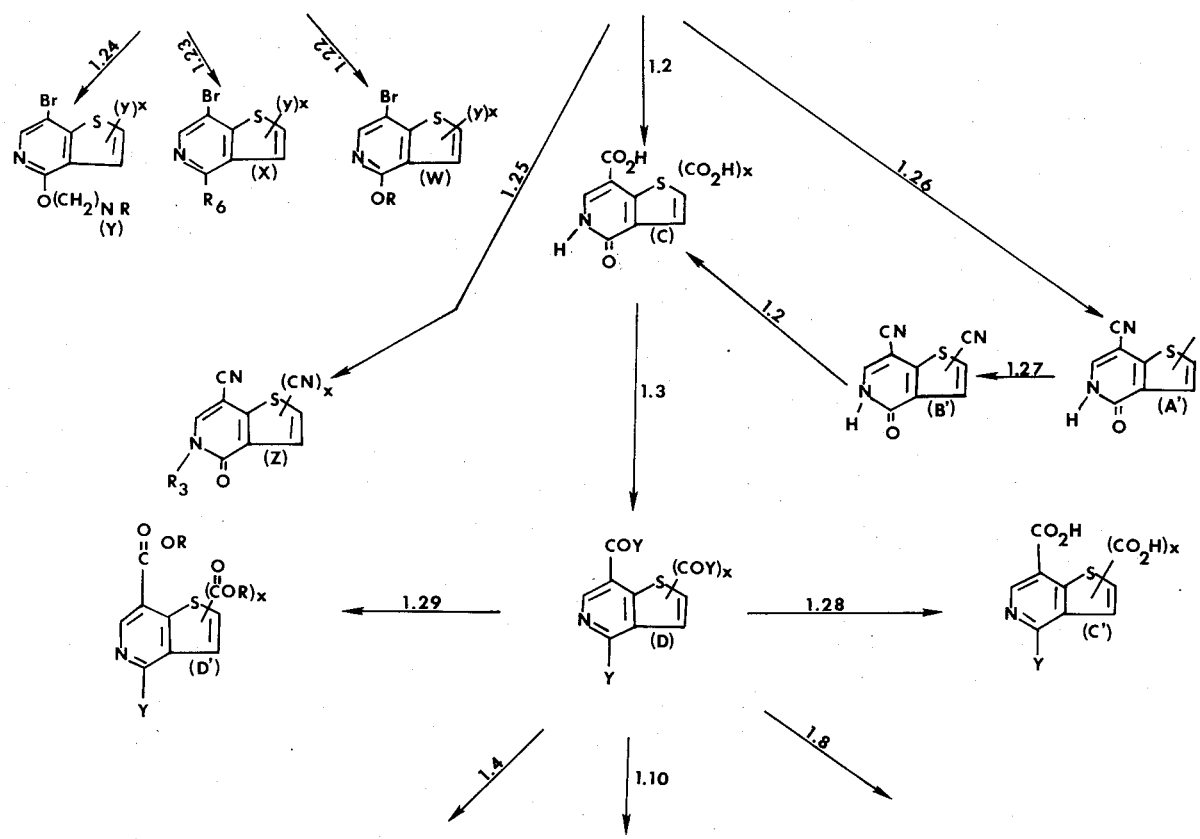

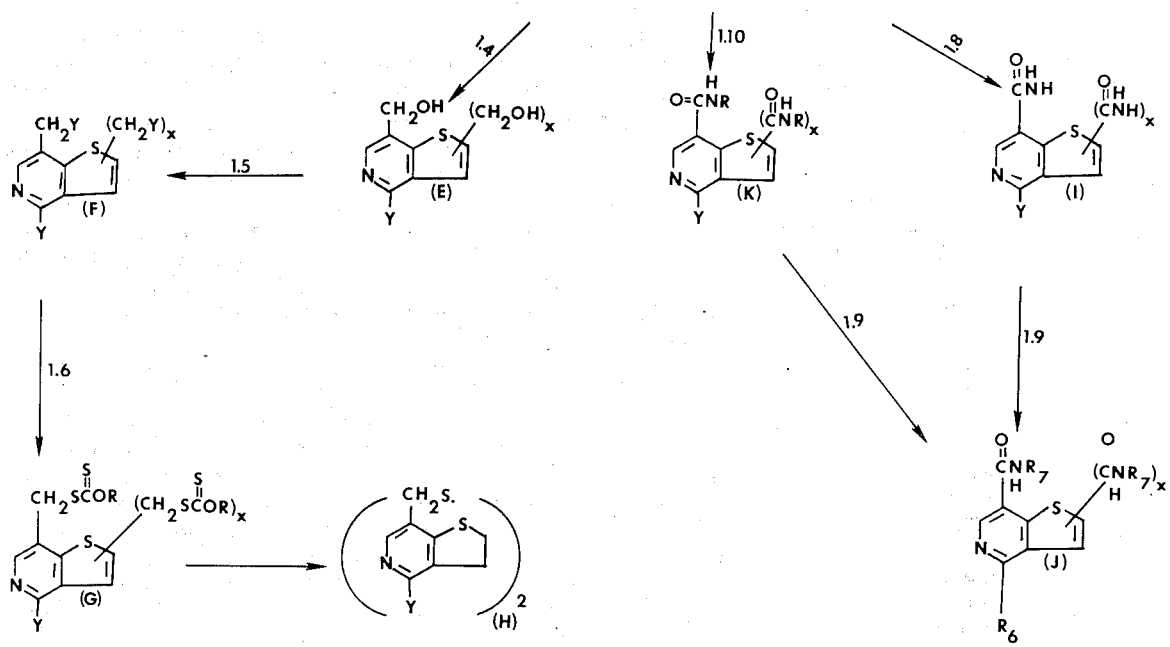

wherein R and $R_7$ are each hydrogen, alkyl such as methyl, ethyl, propyl, butyl and the like, phenyl, aralkyl such as benzyl, phenethyl, o,m or p-tolylbenzyl and the like; $R_6$ is hydrogen, alkylamino, arylamino, aralkylamino, amino, heterocyclicamino such as piperidino, morpholino, azepino, pyrrolidino and the like; $R_7$ is hydrogen; Y is halogen such as fluorine, bromine and the like; x is an integer equal to 0 or 1; and n is an integer ranging from 1 to 6.

REACTIONS AND CONDITIONS

Steps 1.1 and 1.27

The reaction is performed in an inert solvent such as benzene, toluene, dimethylformamide, tetrahydrofuran and the like, in the presence of a cyano-forming reagent such as cuprous cyanide, alkali cyanide such as potassium, sodium and the like, at temperatures ranging from near reflux to reflux. Of particular preference is the combination of cuprous cyanide and dimethylformamide at reflux until the reaction is complete.

Step 1.2

The reaction is performed in the presence of a concentrated or aqueous acid such as sulfuric, hydrochloric and the like, at ambient temperatures. Of particular preference is concentrated sulfuric acid at room temperature.

Step 1.3

The reaction is performed with or without an inert solvent such as ether, benzene, and the like, and an acid halide-forming reagent such as phosphorus trichloride, phosphorus pentachloride, thionyl chloride, phosphorus tribromide, phosphorus oxychloride, and the like, at temperatures ranging from room temperature to reflux. Of particular preference is phosphorus oxychloride at reflux until the reaction is complete.

Step 1.4

The reaction is performed in an inert solvent such as benzene, toluene, ether, tetrahydrofuran, and the like, in the presence of a reducing agent such as lithium aluminum hydride, sodium borohydride, diborane, aluminum hydride and the like, at temperatures ranging from near reflux to reflux. Of particular preference is lithium aluminum hydride at reflux until the reaction is complete.

Step 1.5

The reaction is performed with a hydrohalic acid such as hydrobromic acid, hydrochloric acid and the like, at temperatures ranging from 40°C. to near reflux. Of particular preference is hydrobromic acid at near reflux until the reaction is complete.

Step 1.6

The reaction is performed with water and an alkyl xanthic acid potassium salt, the alkyl substituent being represented by methyl, ethyl, propyl and the like, at temperatures ranging from 15°C.–50°C. Of particular preference is ethyl xanthic acid potassium salt at room temperature until the reaction is complete.

Step 1.7

The reaction is performed with an inert alcohol solvent such as ethanol, methanol, butanol, benzyl alcohol and the like, in the presence of a base such as ammonium hydroxide, sodium hydroxide, and the like, at temperatures ranging from 0°C. to 80°C. Of particular preference is the combination of ethanol and ammonium hydroxide at room temperature until the reaction is complete.

Step 1.8

The reaction is performed with or without an inert solvent such as water, dimethylformamide, ethanol, benzene, toluene and the like, in the presence of a base such as ammonium hydroxide, methylamine, benzylamine, aniline and the like, at temperatures ranging from 10°C. to 50°C. Of particular preference is ammonium hydroxide at room temperature until the reaction is complete.

Step 1.9

The reaction is performed with or without an inert solvent such as benzene, dimethylformamide, toluene, and the like, in the presence of an amino substituent such as piperidine, azepine, morpholine, ammonia, aniline, dimethylamine, benzylamine and the like, at temperatures ranging from 50°C. to reflux. Of particular preference is piperidine at near reflux until the reaction is complete.

Step 1.10

The reaction is performed in an inert solvent such as benzene, toluene, benzyl alcohol, methanol, ethanol, tetrahydrofuran and the like, with an aminoforming substituent such as methylamine, aniline, benzylamine and the like, at temperatures ranging from 10°C. to 40°C. Of particular preference is the combination of methanol and aniline at room temperature until the reaction is complete.

Step 1.11

The reaction is performed by hydrogenation over a catalyst such as palladium-on-carbon, platinum, Raney nickel and the like, in the presence of an inert solvent such as methanol, ethanol, propanol, butanol, benzene, toluene, tetrahydrofuran, and the like, at temperatures ranging from 0°C. to near reflux. Of particular preference is the combination of palladium-on-carbon and methanol at room temperature until the reaction is complete.

Steps 1.12, 1.16 & 1.25

The reaction is performed in an inert solvent such as ether, dimethylsulfoxide, tetrahydrofuran, benzene, toluene and the like, in the presence of a base such as sodium hydride, sodium amide, potassium hydroxide and the like, with an alkyl halide such as methyl iodide, propyl bromide, butyl iodide and the like, or an alkenyl halide such as allyl bromide, vinyl iodide, propenyl chloride and the like, at temperatures ranging from 0°C. to 60°C. Of particular preference is the combination of dimethylformamide, sodium hydride anad methyl iodide at room temperature until the reaction is complete.

Steps 1.13, 1.14 & 1.18

The reaction is performed with or without an inert solvent such as dimethylsulfoxide, tetrahydrofuran, benzene, toluene and the like, in the presence of a base such as sodium amide, potassium hydroxide, 3-dimethylaminepropylamine piperidine, dimethylamine, methylamine, benzylamine, aniline and the like, at temperatures ranging from room temperature to 200°C.

Step 1.15

The reaction is performed with a cuprous alkyl mercaptide complex such as cuprous methyl sulfide, cuprous ethyl sulfide and the like, at temperatures ranging from 80°C. to reflux. Of particular preference is cuprous methyl mercaptide complex at reflux until the reaction is complete.

Step 1.17

The reaction is usually performed without a solvent in the presence of a halogenating reagent such as phosphorus oxychloride, phosphorus trichloride, thionyl chloride, phosphorus tribromide and the like, at temperatures ranging from room temperature to near reflux. Of particular preference is phosphorus oxychloride at near reflux until the reaction is complete.

Step 1.19

The reaction is performed with an inert solvent such as benzene, ether, dimethylformamide, tetrahydrofuran, and the like, and a base such as sodium hydride, sodium amide and the like, in the presence of an alkylcarbonylalkyl, alkylcarbonylaryl or alkylcarbonylaralkyl-forming reagent such as α-chloroacetophenone, α-bromoacetophenone, bromomethylbenzylketone, β-chloroethylmethylketone and the like, at temperatures ranging from 10°C. to 80°C. Of particular preference is the combination of dimethylformamide, sodium hydride and α-bromoacetophenone at room temperature until the reaction is complete.

Steps 1.20 & 1.26

The reaction is performed with an inert solvent such as benzene, dimethylformamide, toluene, tetrahydrofuran, ether and the like, in the presence of a halogenating reagent such as N-bromosuccinimide, N-chlorosuccinimide, chlorine, N-bromophthalimide and the like, at temperatures ranging from room temperature to near reflux. Of particular preference is the combination of dimethylformamide and N-bromosuccinimide at 60°C. until the reaction is complete.

Step 1.21

The reaction is performed with an invert solvent such as ether, benzene, tetrahydrofuran, dimethylformamide, ethanol and the like, and a base such as sodium amide, sodium hydride and the like, in the presence of an alkoxycarbonylalkylhalide, aralkoxycarbonylalkylhalide or phenoxycarbonylalkylhalide and the like, at temperatures ranging from 10°C. to 80°C. Of particular preference is the combination of dimethylformamide, sodium hydride and methylbromoacetate at room temperature until the reaction is complete.

Steps 1.22 & 1.24

The reaction is performed in an inert solvent such as ethanol, benzene, toluene, methanol, tetrahydrofuran, benzyl alcohol and the like, with a base such as sodium hydride, sodium amide, and the like, in the presence of an alkoxy, aryloxy or aralkoxy-forming reagent such as sodium methoxide, benzyl alcohol, phenol, sodium ethoxide and the like, at temperatures to near reflux until the reaction is complete.

Step 1.23

The reaction is performed with or without an inert solvent such as benzene, toluene, tetrahydrofuran, dimethylformamide and the like, and an amino-forming reagent such as piperidine, methylamine, dimethylamine, aniline, azepine, morpholine and the like, at temperatures ranging from room temperature to reflux. Of particular preference is piperidine at near reflux until the reaction is complete.

Step 1.28

The reaction is performed in a ketone solution such as acetone, ethylmethyl ketone, hexanone, and the like, and water at temperatures ranging from 10°C. to near reflux. Of particular preference is the combination of acetone and water at room temperature until the reaction is complete.

Step 1.29

The reaction is performed with or without an inert solvent such as benzene, tetrahydrofuran, dimethylformamide, ether, methylene chloride and the like, in the presence of an alkoxy, aralkoxy or aryloxy-forming reagent such as methanol, benzyl alcohol, phenol and the like, at temperatures ranging from room temperature to 80°C. (preferably 40°C.).

Representative compounds of the invention are:
7-dimethylamino-4-oxo-4,5-dihydrothieno[3,2-c]-pyridine
7-piperidino-4-oxo-4,5-dihydrothieno[3,2-c]-pyridine
7-methylthio-4-oxo-4,5-dihydrothieno[3,2-c]-pyridine
7-phenylthio-4-oxo-4,5-dihydrothieno[[3,2-c]-pyridine
7-benzylthio-4-oxo-4,5-dihydrothieno[[3,2-c]-pyridine
7-bromo-4-oxo-5-methyl-4,5-dihydrothieno[3,2-c]-pyridine
7-bromo-4-oxo-5-benzyl-4,5-dihydrothieno[3,2-c]-pyridine
7-bromo-4-oxo-5-phenyl-4,5-dihydrothieno[3,2-c]-pyridine
7-cyano-4-oxo-4,5-dihydrothieno[3,2-]-pyridine
7-(3-dimethylaminopropylamino)-4-oxo-4,5-dihydrothieno[3,2-c]-pyridine
7-bromo-4-oxo-5-phenacyl-4,5-dihydrothieno[3,2-c]-pyridine
7-bromo-4-chlorothieno[3,2-c]-pyridine
2,7-dibromo-4-oxo-4,5-dihydrothieno[3,2-c]-pyridine
3,7-dibromo-4-oxo-4,5-dihydrothieno[3,2-c]-pyridine
5-methyl-4-oxo-4,5-dihydrothieno[3,2-c]-pyridine
5-benzyl-4-oxo-4,5-dihydrothieno[3,2-c]-pyridine
5-phenyl-4-oxo-4,5-dihydrothieno[3,2-c]-pyridine
7-bromo-4-methoxythieno[3,2-c]-pyridine
7-bromo-4-o,m or p-tolyloxythieno[3,2-c]-pyridine
7-bromo-4-benzyloxythieno[3,2-c]-pyridine
7-bromo-4-phenoxythieno[3,2-c]-pyridine
7-bromo-4-piperidinothieno[3,2-c]-pyridine
7-bromo-4-azepinothieno[3,2-c]-pyridine
7-bromo-4-anilinothieno[3,2-c]-pyridine
7-cyano-2-bromo-4-oxo-4,5-dihydrothieno[3,2-c]-pyridine
7-hydroxy-2-bromo-4-oxo-4,5-dihydrothieno[3,2-c]-pyridine
7-cyano-4-oxo-5-methyl-4,5-dihydrothieno[3,2-c]-pyridine
7-cyano-4-oxo-5-benzyl-4,5-dihydrothieno[3,2-c]-pyridine
7-cyano-4-oxo-5-phenyl-4,5-dihydrothieno[3,2-c]-pyridine
2,7-dicyano-4-oxo-4,5-dihydrothieno[3,2-c]-pyridine
7-carboxy-4-oxo-4,5-dihydrothieno[3,2-c]-pyridine
7-phenethoxy-4-oxo-4,5-dihydrothieno[3,2-c]-pyridine
7-phenethoxy-4-oxo-5-methyl-4,5-dihydrothieno[3,2-c]-pyridine
7-chlorocarbonyl-4-chlorothieno[3,2-c]-pyridine
7-trifluoromethylthio-4-chlorothieno[3,2-c]-pyridine
7-carboxy-4-chlorothieno[3,2-c]-pyridine
7-aceto-4-chlorothieno[3,2-c]-pyridine
7-carbamoyl-4-chlorothieno[3,2-c]-pyridine
7-dimethylcarbamoyl-4-chlorothieno[3,2-c]-pyridine
7-dimethylcarbamoyl-4-bromothieno[3,2-c]-pyridine
7-carbamoyl-4-aminothieno[3,2-c]-pyridine
7-carbamoyl-4-piperidinothieno[3,2-c]-pyridine
methyl-4-chlorothieno[3,2-c]-pyridine-7-carboxylate
benzyl-4-chlorothieno[3,2-c]-pyridine-7-carboxylate
phenyl-4-chlorothieno[3,2-c]-pyridine-7-carboxylate
methyl-4-bromothieno[3,2-c]-pyridine-7-carboxylate
7-phenylcarbamoyl-4-chlorothieno[3,2-c]-pyridine
7-hydroxymethyl-4-chlorothieno[3,2-c]-pyridine
7-hydroxyethyl-4-chlorothieno[3,2-c]-pyridine
7-bromomethyl-4-chlorothieno[3,2-c]-pyridine
7-iodomethyl-4-chlorothieno[3,2-c]-pyridine
7-ethylxanthylmethyl-4-chlorothieno[3,2-c]-pyridine
7-benzylxanthylmethyl-4-chlorothieno[3,2-c]-pyridine
7-benzylxanthylmethyl-4-bromothieno[3,2-c]-pyridine
7-phenylxanthylmethyl-4-chlorothieno[3,2-c]-pyridine
bis-4-chloro-7-thiomethylthieno[3,2-c]-pyridine
bis-4-chloro-7-thioethylthieno[3,2-c]-pyridine
7-dimethylamino-4-oxo-5-anilinomethyl-4,5-dihydrothieno[3,2-c]-pyridine
7dimethylamino-4-oxo-5-benzylaminomethyl-4,5-dihydrothieno[3,2-c]-pyridine
7-amino-4-oxo-5-ethylaminomethyl-4,5-dihydrothieno[3,2-c]-pyridine
7-piperidino-4-oxo-5-methyl-4,5-dihydrothieno[3,2-c]-pyridine
7-piperidino-4-oxo-5-acetyl-4,5-dihydrothieno[3,2-c]-pyridine
7-benzoyl-4-oxo-5-carboxyalkyl-4,5-dihydrothieno[3,2-c]-pyridine
7-benzoyl-4-oxo-5-benzylcarbonyloxyalkyl-4,5-dihydrothieno[3,2-c]-pyridine
7-cyano-4-oxo-5-methylcarbonylmethyl-4,5-dihydrothieno[3,2-c]-pyridine
7-dimethylamino-4-oxo-5-methylcarbonylmethyl-4,5-dihydrothieno[3,2-c]-pyridine
7-methylaminoethylamino-4-oxo-5-methyl-4,5-dihydrothieno[3,2-c]-pyridine
5-methyl-(7-bromo-4-oxo-4,5-dihydrothieno[3,2-c]-pyridine)-acetate
7-cyano-4-oxo-2-bromothieno[3,2-c]-pyridine The compounds of this invention are administered orally, topically, intravenously or intramuscularly in the treatment of inflammation, fever, anxiety and pain. Of particular preference is the oral form ranging from 10 to 2000 mg./kg. of body weight per day. Of preference is 50–500 mg./kg. of body weight per day for varying periods of treatment as required. Comparable amounts of the compounds may be administered in topical or parenteral forms.

For these purposes, the compounds of the invention may be admisistered orally, topically and parenterally in dosage unit formulations containing conventional nontoxic pharmaceutically acceptable carriers, adjuvants and vehicles. The term "parenterally" as used herein includes intravenous or intramuscular. In addition to the treatment of warm-blooded animals such as mice, rats, horses, dogs, cats, etc., the compounds of the invention are effective in the treatment of humans.

The pharmaceutical compositions containing the active ingredient may be in a form suitable for oral use, for example, as tablets, troches, lozenges, aqueous or oil suspensions, dispersible powders or granules, emulsions, hard or soft capsules, syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active ingredient in admixture with non-toxic pharmaceutically acceptable excipients which are suitable for the manufacture of tablets. These excipients may be, for example, inert diluents such as calcium carbonate, sodium carbonate, lactose, calcium phosphate or sodium phosphate; granulating and disintegrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastrointestinal tract and thereby provide a sustained action over a longer period. For example, a time delay material such as glyceryl monostearate or glyceryl distearate alone or with a wax may be employed.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example, arachis oil, peanut oil, liquid paraffin or olive oil.

Aqueous suspensions contain the active materials in admixture with axcipients suitable for the manufacture of aqueous suspensions. Such excipients are suspending agents, for example, sodium carboxymethylcellulose, methylcellulose, hydroxypropylmethylcellulose, sodium alginate, polyvinylpyrrolidone, gum tragacanth and gum acacia; dispersing or wetting agents may be a naturally occurring phosphatide, for example, lecithin, or condensation products of an alkylene oxide with fatty acids, for example, polyoxyethylene stearate, or condensation products of ethylene oxide with long chain aliphatic alcohols, for example, heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example, polyoxyethylene sorbitan monooleate. The said aqueous suspensions may also contain one or more preservatives, for example, ethyl or n-propyl p-hydroxy benzoate, one or more coloring agents, one or more flavoring agents and one or more sweetening agents, such as sucrose or saccharin.

Oily suspensions may be formulated by suspending the active ingredient in a vegetable oil, for example, arachis oil, olive oil, sesame oil, or coconut oil, or in a mineral oil such as liquid paraffin. The oil suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example, sweetening, flavoring and coloring agents, may also be present.

The pharmaceutical compositions of the invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally occurring gums, for example, gum acacia or gum tragacanth, naturally-occurring phosphatides, for example, soya bean, lecithin, and esters or partial esters derived from fatty acids and hexitol anhydrides, for example, sorbitan mono-oleate, and condensation products of said partial esters with ethylene oxide, for example, polyoxyethylene sorbitan monooleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents.

For intravenous and intramuscular administrations, the pharmaceutical compositions may be in the form of a sterile injectable preparation, for example, as a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally acceptable diluent or solvent, for example, as a solution in 1,3-butane diol. Among the acceptable vehicles and solvents that may be employed are water, Ringer's solution, and isotonic sodium chloride solution. In addition, sterile, fixed oils are conventionally employed as a solvent or suspending medium. For this purpose, any bland fixed oil may be employed including synthetic mono- or di-glycerides. In addition, fatty acids such as oleic acid find use in the preparation of injectables.

The amount of active ingredient that may be combined with the carrier materials to produce a single dosage form will vary depending upon the host treated and the particular mode of admistration. For example, a formulation intended for the oral admisistration of humans may contain from 5 mg. to 10 grams of active agent compounded with an appropriate and convenient amount of carrier material which may vary from about 5 to about 95 percent of the total composition. Dosage unit forms will generally contain between from about 175 mg. to about 1.75 g. of active ingredient. Comparable amounts of the compounds may be administered in topical or parenteral forms.

It will be understood, however, that the specific dose level for any particular patient will depend upon a variety of factors including the activity of the specific compound employed, the age, body weight, general health, sex, diet, time of administration, route of administration, rate of excretion, drug combination and the severity of the particular disease undergoing therapy.

The starting material employed in the invention is represented by compound (A) which is shown in Flow Sheet I. Said starting material is known and processes for its preparation can be found in the literature. For example, see Bulletin des Societes Chemiques Belges 79, 407–14 (1970) and Chemical Abstracts 73, 120639 U (1970).

The following examples illustrate the preparation of the various thieno [3,2-c]-pyridine compounds described herein as anti-inflammatory anti-pyretic, tranquilizing and analgesic agents. The examples should be construed as illustrations of the invention rather than limitations thereof.

EXAMPLE 1

4-Oxo-4,5-dihydrothieno[3,2-c]-pyridine

A solution containing 9.2 g. of 7-bromo-4-oxo4,5-dihydrothieno[3,2-c]-pyridine in 300 ml. of methanol and 4.0 g. of potassium acetate is hydrogenated in the presence of 1 g. of 10% palladium-on-charcoal. After the theoretical amount of hydrogen has been absorbed the catalyst is removed by filtration, the solvent evaporated and the residue washed with water. Crystallization from methanol gives crystals of 4-oxo-4,5-dihydrothieno[3,2-c]pyridine, m.p. 208°–209°C.

EXAMPLE 2

7-Dimethylamino-4-oxo-4,5-dihydrothieno[3,2-c]-pyridine

A mixture which contains 9 g. of 7-bromo-4-oxo4,5-dihydrothieno[3,2-c]-pyridine and 100 ml. of 40% dimethylamine is heated in a bomb at 170°C. for 24 hours. The solvent is evaporated and the solid residue washed with water and then crystallized from methanol to yield the product, m.p. 210°–211°C.

When 7-bromo-4-oxo-5-benzyl-4,5-dihydrothieno [3,2-c]-pyridine, 7-bromo-4-oxo-5-methyl-4,5-dihydrothieno [3,2-c]-pyridine 7-bromo-4-oxo-5-ethyl-4,5-dihydrothieno [3,2-c]-pyridine or 7-bromo-4-oxo-5-benzyl-4,5-dihydrothieno[3,2-c]-pyridine is substituted for 7-bromo-4-oxo4,5-dihydrothieno]3,2-c]-pyridine, there is obtained 7-dimethylamino-4-oxo-5-benzyl-4,5-dihydrothieno[3,2-c]-pyridine, 7-dimethylamino-4-oxo-5-methyl-4,5-dihydrothieno [3,2-c]-pyridine, 7-dimethylamino-4-oxo-5-ethyl-4,5-dihydrothieno 3,2-c]-pyridine or 7-dimethylamino-4-oxo-5-benzyl4,5-dihydrothieno3,2-c]-pyridine, respectively.

EXAMPLE 3

7-Piperidino-4-oxo-4,5-dihydrothieno[3,2-c]-pyridine

A mixture of 10 g. of 7-bromo-4-oxo-4,5-dihydrothieno[3,2-c]-pyridine and 75 ml. of piperidine is heated in a bomb at 160°C. for 60 hours. After the excess piperidine is removed in vacuo, water is added to the residue and the product crystallizes. It is then crystallized from ethanol and then ethyl acetate and melted at 188°–189°C. with a softening at 165°C.

When ammonia, aniline, benzylamine, azepine, morpholine, methylpiperazine or pyrrolidine is substituted for piperidine, there is obtained 7-amino-4-oxo-4,5-dihydrothieno[3,2-c]-pyridine, 7-anilino-4-oxo-4,5-dihydrothieno[3,2-c]-pyridine, 7-benzylamino-4-oxo-4,5-dihydrothieno[3,2-c]-pyridine, 7-azepino-4-oxo-4,5-dihydrothieno [3,2-c]-pyridine, 7-morpholino-4-oxo-4,5-dihydrothieno [3,2-c]-pyridine, 7-methylpiperazino-4-oxo-4,5-dihydrothieno [3,2-c]-pyridine or 7-pyrrolidino-4-oxo-4,5-dihydrothieno [3,2-c]-pyridine, respectively.

EXAMPLE 4

7-Methylthio-4-oxo-4,5-dihydrothieno[3,2-c]-pyridine

The cuprous methyl mercaptide is prepared by heating, under reflux, with good stirring, 4.0 g. of copper powder, 60 ml. of utidine and 7 ml. of methyl disulfide at 110°–120°C. for 4 hours. The mixture is cooled and 12.5 g. of 7-bromo-4-oxo-4,5-dihydrothieno-[3,2-c]-pyridine added and the mixture refluxed for 19 hours. The solvents are removed in vacuo and the black gum residue stirred with 200 ml. of 2.5 N sodium hydroxide at 70°C. for 15 hours. The liquid is decanted from the dark oil and extracted with ether to remove any remaining lutidine and then the alkaline solution is neutralized with hydrochloric acid. The resulting precipitate is crystallized twice from ethanol, m.p. 207°–211°C.

When benzyl disulfide or phenyl disulfide is substituted for methyl disulfide, there is obtained 7-benzylthio-4-oxo-4,5-dihydrothieno[3,2-c]-pyridine or 7-phenylthio-4-oxo-4,5-dihydrothieno[3,2-c]-pyridine, respectively.

EXAMPLE 5

7-Bromo-4-oxo-5-methyl-4,5-dihydrothieno[3,2-c]-pyridine

A mixture of 5 g. of 7-bromo-4-oxo-4,5-dihydrothieno[3,2-c]-pyridine, 100 ml. of acetone and 5 g. of anhydrous potassium carbonate is refluxed with stirring and 10 ml. portions of methyl iodide added three times over 6 hours. No total solution occurs. The precipitate is removed by filtration and the filtrate evaporated. The solid is triturated with 2.5 N sodium hydroxide, and the insoluble material dissolved in ether, dried, and the ether evaporated. The residue is crystallized from hexane, m.p. 115°–120°C.

When benzyl chloride, ethylbromide or dimethylaminoethylchloride is substituted for methyl iodide, there is obtained 7-bromo-4-oxo-5-benzyl-4,5-dihydrothieno[3,2-c]-pyridine, 7-bromo-4-oxo-5-ethyl-4,5-dihydrothieno[3,2-c]-pyridine, 7-bromo-4-oxo-5-dimethylaminoethyl-4,5-dihydrothieno[3,2-c]-pyridine, respectively.

EXAMPLE 6

7-Cyano-4-oxo-4,5-dihydrothieno[3,2-c]-pyridine

A mixture of 25 g. of 7-bromo-4-oxo-4,5-dihydrothieno[3,2-c]-pyridine, 350 ml. of dimethylformamide and 21 g. of cuprous cyanide is heated under reflux for 18 hours. This solution is poured into a solution containing 200 g. of ferric chloride, 300 ml. of water, and 50 ml. of concentrated hydrochloric acid. After 20 minutes at 65°–70°C., a liter of water is added and the mixture cooled, filtered, and the precipitate washed with water. This crude material can be used in many reactions, but it can be purified by crystallization from a large quantity of acetone, m.p. 285°–287°C.

EXAMPLE 7

7-(3-Dimethylaminopropylamino)-4-oxo-4,5-dihydrothieno-[3,2-c]-pyridine, 1,5-Naphthalene disulfonic acid salt A mixture of 10 g. of 7-bromo-4-oxo-4,5-dihydrothieno[3,2-c]-pyridine and 60 g. of 3-dimethylamino propylamine is heated at 160°C. for 60 hours. The solvent is removed in vacuo and the residue dissolved in 25 ml. of 2.5 N sodium hydroxide. This basic solution is extracted with ether several times to remove any excess amine. the sodium hydroxide solution is then neutralized with 28 ml. of 2.5 N hydrochloric acid, and then extracted 4 times with chloroform. This chloroform solution is washed with water, dried, and then, a solution of 1,5-naphthalene disulfonic acid in methanol is added. The precipitate is removed by filtration and cyrstallized from methanol-water, or water alone, m.p. 171°–173°C.

EXAMPLE 8

7-Bromo-4-oxo-5-phenacyl-4,5-dihydrothieno[3,2-c]-pyridine

To a solution of 6.9 g. of 7-bromo-4-oxo-4,5-dihydrothieno[3,2-c]-pyridine in 75 ml. of dimethylformamide is added 1.5 g. of a 50% emulsion of sodium hydride. After the sodium hydride is dissolved and the temperature has fallen to room temperature, 6 g. of α-bromoacetophpenone is added. The temperature rises to 45°C. and after 2 hours when the temperature is down to room temperature, 75 ml. of methanol and 75 ml. of water are added. The resulting crystalline precipitate is removed by filtration and heated in 200 ml. of boiling methanol. Four grams do not dissolve and are crystallized from 400 ml. of absolute ethanol, m.p. 210°–211°C.

EXAMPLE 9

7-Bromo-4-chlorothieno[3,2-c]-pyridine

A solution of 2 g. of 7-bromo-4-oxo-4,5-dihydrothieno[3,2-c]-pyridine and 20 ml. of phosphorus oxychloride is heated on the steam-bath for 2 hours. It is then poured onto ice and after the decomposition of the phosphorus oxychloride, the solid is removed by filtration. The product crystallizes from methanol, m.p. 114°–115°C.

EXAMPLE 10

2,7-Dibromo-4-oxo-4,5-dihydrothieno[3,2-c]-pyridine

To a solution of 2.3 g. of 7-bromo-4-oxo-4,5-dihydrothieno[3,2-c]-pyridine in 60 ml. of dimethylformamide at 60°C. is added 1.9 g. of N-bromosuccinimide. The product begins to crystaliize from the warm solution in 5 minutes. After cooling and filtering, the product is crystallized from hot dimethylformamide, m.p. 295°–296°C.

When N-chlorosuccinimide or N-iodosuccinimide is substituted for N-bromosuccinimide, there is obtained 7-bromo-2-chloro-4-oxo-4,5-dihydrothieno[3,2-c]-pyridine or 7-bromo-2-iodo-4-oxo-4,5-dihydrothieno[3,2-c]-pyridine, respectively.

EXAMPLE 11

5-Methyl-(7-bromo-4-oxo-4,5-dihydrothieno[3,2-c]-pyridine)acetate

To a mixture of 6.9 g. of 7-bromo-4-oxo-4,5-dihydrothieno[3,2-c]-pyridine in 75 ml. of dimethylformamide is added 1.5 g. of a 50% emulsion of sodium hydride. When all the sodium hydride has dissolved, and the solution has returned to room temperature, 5 ml. of methyl bromo acetate is added. The temperature rises to 45°C. and when it goes down to room temperature, 200 ml. of water is added and an oil separates. The mother liquor is decanted and crystals separate. They are recrystallized from ethyl acetate, m.p. 107°–108°C.

When benzyl bromo acetate or phenethyl bromo acetate is substituted for methyl bromo acetate, there is obtained 5-benzyl-(7-bromo-4-oxo-4,5-dihydrothieno[3,2-c]-pyridine)-acetate or 5-phenethyl-(7-bromo-4-oxo-4,5-dihydrothieno[3,2-c]-pyridine)-acetate, respectively.

EXAMPLE 12

5-Methyl-4-oxo-4,5-dihydrothieno[3,2-c]-pyridine, 1,5Naphthalene disulfonic acid salt To a solution of 1.5 g. of 4-oxo-4,5-dihydrothieno[3,2-c]-pyridine in 30 ml. of dimethylformamide is added 0.5 g. of a 50% emulsion of sodium hydride. After stirring for 30 minutes, 3 ml. of methyl iodide is added and stirred an additional hour. The addition of 200 ml. of water does not produce a precipitate. The mixture is extracted four times with chloroform and evaporated to give an oily precipitate which is extracted with 2 × 5 ml. of 2.5 N hydrochloric acid. The acid solution is made basic with ammonium hydroxide and the product extracted with ether. The ether is evaporated and a methanol solution of 1.5-naphthalene disulfonic acid added. The resulting precipitate is recrystallized from methanol, m.p. 256°–257°C.

When benzyl chloride, ethyl bromide or dimethylaminoethylchloride is substituted for methyl iodide, there is obtained 5-benzyl-4-oxo-4,5-dihydrothieno[3,2-c]pyridine, 5-ethyl-4-oxo-4,5-dihydrothieno[3,2-c]-pyridine, 5-dimethylaminoethyl-4-oxo-4,5-dihydrothieno[3,2-c]-pyridine, respectively.

EXAMPLE 13

7-bromo-4-methoxythieno[3,2-c]-pyridine

To 1.5 g. of 7-bromo-4-chlorothieno[3,2-c]-pyridine in 50 ml. of methanol is added 1.5 g. of sodium methoxide. The resulting mixture is heated under reflux for 70 hours. The mixture is filtered and the filtrate evaporated and the residue washed with water. Crystallization from methanol, yields the product, m.p. 91°–94°C.

EXAMPLE 14

7-Bromo-4-benzyloxythieno[3,2-c]-pyridine

A sample of 2.0 g. of 50% sodium hydride emulsion is washed with ether to remove the emulsifying oil. To this is added 25 ml. of benzyl alcohol. When all the sodium hydride has reacted, 2.5 g. of 4-chloro-7-bromothieno[3,2-c]-pyridine is added and the mixture heated on the steam-bath for 40 hours. 200 Ml. of water is added and shaken. The water layer is decanted and another 200 ml. of water is added, shaken and then decanted. The solid remaining is crystallized from acetone by the addition of water. It is recrystallized from hexane, m.p. 84°–86°C.

When phenethanol is substituted for benzyl alcohol, there is obtained 7-bromo-4-phenethoxy[3,2-c]-pyridine.

EXAMPLE 15

4-Piperidino-7-bromothieno[3,2-c]-pyridine

To 2.5 g. of 7-bromo-4-chlorothieno[3,2-c]pyridine is added 10 ml. of piperidine. After heating under reflux for 10 minutes, a precipitate appears. The resulting mixture is heated for an additional 3 hours. Water is added and the precipitate removed by filtration. The product is crystallized from ethanol, m.p. 95°–97°C.

When ammonia, dimethylamine, aniline, benzylamine, phenethylamine, azepine, morpholine or methylpiperazine is substituted for piperidine, there is obtained 7-amino-7-bromothieno[3,2-c]-pyridine, 4-dimethylamino-7-bromothieno[3,2-c]-pyridine, 4-anilino-7-bromothieno[3,2-c]-pyridine, 4-benzylamino-7-bromothieno[3,2c]-pyridine, 4- phenethylamino-7-bromothieno[3,2-c]-pyridine, 4-azepino-7-bromothieno[3,2c]-pyridine, 4-morpholino-7-bromothieno[3,2-c]-pyridine or 4-methylpiperazino-7-bromothieno[3,2-c]-pyridine, respectively.

EXAMPLE 16

7-Cyano-2bromo-4-oxo-4,5-dihydrothieno[3,2-c]-pyridine

To a solution of 1.76 g. of 7-cyano-4-oxo-4,5-dihydrothieno[3,2-c]-pyridine in 35 ml. of dimethylformamide at 60°C. is added 1.95 g. of N-bromosuccinimide over 5 minutes. After 10 minutes, the solution is cooled and 75 ml of water is added to precipitate a solid. This product is crystallized from hot dimethylformamide, m.p. 303°–304°C.

When N-chlorosuccinimide, N-fluorosuccinimide or N-iodosuccinimide is substituted for N-bromosuccinimide, there is obtained 7-cyano-2-chloro-4-oxo-4,5-dihydrothieno[3,2-c]-pyridine, 7-cyano-2-fluoro-4-oxo-4,5-dihydrothieno[3,2-c]-pyridine or 7-cyano-2-iodo-4-oxo-4,5-dihydrothieno[3,2-c]-pyridine, respectively.

EXAMPLE 17

7-Cyano-4-oxo-5-methyl-4,5-dihydrothieno[3,2-c]-pyridine

To a stirred solution of 1.96 g. of 7-cyano-4-oxo-4,5-dihydrothieno[3,2-c]-pyridine in 30 ml. of dry dimethylformamide is added 0.48 g. of 50% sodium hydride emulsion. When all the sodium hydride has dissolved and the solution is at room temperature, 2 ml. of methyl iodide is added and the solution stirred for 2 hours at room temperature. Water is added and the resulting precipitate filtered, dissolved in acetone, filtered, and the clear filtrate evaporated. The residue is crystallized from ethyl acetate to give the product, m.p. 169°–170°C.

When benzyl chloride, ethyl bromide or dimethylaminoethylchloride is substituted for methyl iodide, there is obtained 7-cyano-4-oxo-5-benzyl-4,5-dihydrothieno[3,2-c]-pyridine, 7-cyano-4-oxo-5-ethyl-4,5-dihydrothieno[3,2-c]-pyridine or 7-cyano-4-oxo-5-dimethylaminomethyl-4,5-dihydrotheino[3,2-c]-pyridine, respectively.

EXAMPLE 18

2,7-Dicyano-4-oxo-4,5-dihydrothieno[3,2-c]-pyridine

A mixture of 4.6 g. of 2,7-dibromo-4-oxo-4,5-dihydrothieno[3,2-c]-pyridine, 6.0 g. of cuprous cyanide and 200 ml. of dimethylformamide is heated under reflux for 18 hours. The mixture is poured into a solution containing 60 g. of ferric chloride, 90 ml. of water, and 15 ml. of concentrated hydrochloric acid. After 15 minutes at 65°C., the solution is diluted with water to 600 ml. and the precipitate filtered. Cyrstallization from acetone and water gives a product with a melting point of 262°–264°C.

When 2,7-dibromo-4-oxo-5-methyl-4,5-dihydrothieno[3,2-c]-pyridine, 2,7-dibromo-4-oxo-5-benzyl-4,5-dihydrothieno[3,2-c]-pyridine is substituted for 2,-7-dibromo-4-oxo-4,5-dihydrothieno[3,2-c]-pyridine, there is obtained 2,7-dicyano-4-oxo-5-methyl-4,5-dihydrothieno[3,2-c]-pyridine or 2,7-dicyano-4-oxo-5-benzyl-4,5-dihydrothieno[3,2-c]-pyridine, respectively.

EXAMPLE 19

7-Carboxy-4-oxo-4,5-dihydrothieno[3,2-c]-pyridine

Seven grams of 7-cyano-4-oxo-4,5-dihydrothieno[3,2-c]-pyridine is dissolved in 28 ml. of concentrated sulfuric acid with stirring. The solution gets warm. After 2 hours, the temperature drops to room temperature and slowly, with stirring, 3 g. of crushed sodium nitrite is added. After an additional 2 hours, the mixture is cautiously warmed on the steam-bath for 7 minutes. After cooling, the solution is added to ice. The carboxylic acid separates and is removed by filtration. The product is crystallized from dimethylformamide by the addition of acetone, m.p. 344°–346°C.

When 2,7-dicyano-4-oxo-4,5-dihydrothieno[3,2-c]-pyridine, 7-cyano-4-oxo-5-methyl-4,5-dihydrothieno[3,2-c]-pyridine or 7-cyano-4-oxo-5-benzyl-4,5-dihydrothieno[3,2-c]-pyridine is substituted for 7-cyano-4-oxo-4,5-dihydrothieno[3,2-c]-pyridine, there is obtained 2,7-dicarboxy-4-oxo-4,5-dihydrothieno[3,2-c]-pyridine, 7-carboxy-4-oxo-5-methyl-4,5-dihydrothieno[3,2-c]-pyridine or 7-carboxy-4-oxo-5-benzyl-4,5-dihydrothieno[3,2-c]-pyridine, respectively.

EXAMPLE 20

7-Chlorocarbonyl-4-chlorothieno[3,2-c]-pyridine

Six grams of 7-carboxy-4-oxo-4,5-dihydrothieno[3,2-c]-pyridine and 100 ml. of phosphorus oxychloride are heated under reflux for 18 hours. The solution is poured onto ice and stirred until the excess phosphorus oxychloride has decomposed. The acid chloride is crystallized by dissolving it in acetone and adding water and filtering the product rapidly, m.p. 119°–120°C.

When 2,7-dicarboxy-4-oxo-4,5-dihydrothieno[3,2-c]-pyridine or 3,7-dicarboxy-4-oxo-4,5-dihydrothieno[3,2-c]-pyridine is substituted for 7-carboxy-4-oxo-4,5-dihydrothieno[3,2-c]-pyridine, there is obtained 2,7-di-(chlorocarbonyl)-4-oxo-4,5-dihydrothieno[3,2-c]-pyridine or 3,7-di-(chlorocarbonyl)-4-oxo-4,5-dihydrothieno[3,2-c]-pyridine, respectively.

EXAMPLE 21

7-Carboxy-4-chlorothieno[3,2-c]-pyridine

When the acid chloride in acetone solution is treated with water, the acid chloride crystallizes, but in the filtrate is found some of the acid which can be obtained by evaporation of the filtrate. It changes form at 220°–225°C. but does not become liquid until a temperature of 350°–355°C. is reached.

When 2,7-di-chlorocarbonyl-4-chlorothieno[3,2-c]-pyridine is substituted for 7-chlorocarbonyl-4-chlorothieno[3,2-c]-pyridine, there is obtained 2,7-dicarboxy-4-chlorothieno[3,2-c]-pyridine.

EXAMPLE 22

4-Chlorothieno[3,2-c]-pyridine-7-carboxamide

To 100 mg. of the acid chloride is added 2 ml. of ammonium hydroxide. No solution results, but after 15 minutes the solid present is removed by filtration and crystallized from dimethylformamide, alcohol and water, m.p. 245°–246°C.

When 2,7-di-chlorocarbonyl-4-chlorothieno[3,2-c]-pyridine is substituted for 7-chlorocarbonyl-4-chlorothieno[3,2-c]-pyridine, there is obtained 4-chlorothieno[3,2-c]-pyridine-2,7-di-carboxamide.

EXAMPLE 23

4-Aminothiono[3,2-c]-pyridine-7-carboxamide

A mixture of 3 g. of 4-chlorothieno[3,2-c]-pyridine-7-carboxamide and 30 ml. of liquid ammonia is heated at 150°C. for 18 hours in a bomb. After evaporation of the ammonia, the product is crystallized from hot water, from which it separates as a hydrate, m.p. 112°–113°C.

When dimethylamine, benzylamine or aniline is substituted for ammonia, there is obtained 4-dimethylaminothieno[3,2-c]-pyridine-7-carboxamide, 4-benzylaminothieno[3,2-c]-pyridine-7-carboxamide or 4-anilinothieno[3,2-c]-pyridine-7-carboxamide, respectively.

When 4-chlorothieno[3,2-c]-pyridine-2,7-dicarboxamide is substituted for 4-chlorothieno[3,2-c]-pyridine-7-carboxamide, there is obtained 4-aminothieno[3,2-c]-pyridine-2,7-di-carboxamide.

EXAMPLE 24

4-Piperidino-7-carbamylthieno[3,2-c]-pyridine

To 500 mg. of 4-chlorothieno[3,2-c]-pyridine-7-carboxamide is added 15 ml. of piperidine and the mixture heated under reflux. Since a solution was not formed, 3 ml. of dimethylformamide is added and the resulting solution heated under reflux for 3 hours. Water is added to the point of crystallization and the crystals separated by filtration and crystallized from ethanol, m.p. 205°–207°C.

When azepine, morpholine, pyrrolidine or methylpiperazine is substituted for piperidine, there is obtained 4-azepino-7-carbamylthieno[3,2-c]-pyridine, 4-morpholino-7-carbamylthieno[3,2-c]-pyridine, 4-pyrrolidino-7-carbamylthieno[3,2-c]-pyridine or 4-methylpiperazino-7-carbamylthieno[3,2-c]-pyridine, respectively.

When 4-chlorothieno[3,2-c]-pyridine-2,7-dicarboxamide is substituted for 4-chlorothieno-[3,2-c]-pyridine-7-carboxamide, there is obtained 4-piperidinothieno[3,2-c]-pyridine-2,7-di-carboxamide.

EXAMPLE 25

Methyl 4-chlorothieno[3,2-c]-pyridine-7-carboxylate

The acid chloride is warmed in methanol and upon cooling the ester crystallized, m.p. 110°–111°C.

When benzyl alcohol or phenol is substituted for methanol, there is obtained benzyl-4-chlorothieno[3,2-c]-pyridine-7-carboxylate or phenyl-4-chlorothieno[3,2-c]-pyridine-7carboxylate, respectively.

When 2,7-di-chlorocarbonyl-4-chlorothieno[3,2-c]-pyridine is substituted for 7-chlorocarbonyl-4-chlorothieno[3,2-c]-pyridine, there is obtained dimethyl-4-chlorothieno[3,2-c]-pyridine-2,7-di-carboxylate.

EXAMPLE 26

4-Chlorothieno[3,2-c]-pyridine-7-carboxanilide

To 300 mg of aniline is added 300 mg. of the acid chloride. After the vigorous reaction has cooled, methanol is added and the solid removed by filtration. The product is crystallized from dimethylformamide, methanol and water, m.p. 229°–230°C.

When benzylamine, dimethylamine, azepine, morpholine, piperidine, pyrrolidine or methylpiperazine is substituted for aniline, there is obtained 7-benzylcarbamyl-4-chlorothieno[3,2-c]-pyridine, 7-dimethylcarbamyl-4-chlorothieno[3,2-c]-pyridine, 7-azepinocarbamyl-4-chlorothieno[3,2-c]-pyridine, 7-morpholinocarbamyl-4-chlorothieno[3,2-c]-pyridine, 7-piperidinocarbamyl-4-chlorothieno[3,2-c]-pyridine, 7-pyrrolidinocarbamyl-4-chlorothieno[3,2-c]-pyridine or methylpiperazinecarbamyl-4-chlorothieno[3,2-c]-pyridine, respectively.

When 2,7-di-chlorocarbonyl-4-chlorothieno[3,2-c]-pyridine is substituted for 7-chlorocarbonyl-4-chlorothieno[3,2-c]-pyridine, there is obtained 4-chlorothieno[3,2-c]-pyridine-2,7-dicarboxanilide.

EXAMPLE 27

4-Chloro-7-hydroxymethylthieno[3,2-c]-pyridine

To 400 ml. of ether is added 3,5 g. of lithium aluminum hydride. After stirring for 45 minutes, a solution containing 12 g. of 7-chlorocarbonyl-4-chlorothieno[3,2-c]-pyridine in 500 ml. of ether is slowly added. The mixture is gently refluxed with good stirring for 18 hours. Water is cautiously added to the mixture and when all the hydride has reacted, the mixture is filtered. The ether solution is dried and evaporated. This product is crystallized from chloroform by the addition of hexane, m.p. 88°–89°C.

When 2,7-di-chlorocarbonyl-4-chlorothieno[3,2-c]-pyridine is substituted for 7-chlorocarbonyl-4-chlorothieno[3,2-c]-pyridine, there is obtained 2,7-dihydroxymethyl-4-chlorothieno[3,2-c]-pyridine.

EXAMPLE 28

4-Chloro-7-bromomethylthieno[3,2-c]-pyridine

A solution of 5 g. of 4-chloro-7-hydroxymethyl-thieno[3,2-c]-pyridine in 50 ml. of hydrobromic acid is heated under reflux for 6 minutes. After cooling, the crystals are separated by filtration and washed with acetone, m.p. 217°–219°C.

When 2,7-dihydroxymethyl-4-chlorothieno[3,2-c]-pyridine is substituted for 7-hydroxymethyl-4-chlorothieno[3,2-c]-pyridine, there is obtained 2,7-dibromomethyl-4-chlorothieno[3,2-c]-pyridine.

EXAMPLE 29

4-Chloro-7-ethylxanthylmethylthieno[3,2-c]-pyridine

To 5 g. of 4-chloro-7-bromomethylthieno[3,2-c]-pyridine hydrogen bromide is added 7 g. of ethyl xanthic acid potassium salt in 125 ml. of water. This mixture is stirred at room temperature and the white solid separated. This solid is crystallized from ethanol, m.p. 91°–92°C.

When 2,7-dibromomethyl-4-chlorothieno[3,2-c]-pyridine is substituted for 7-bromoethyl-4-chlorothieno[3,2-c]-pyridine, there is obtained 2,7-diethylxanthylmethyl-4-chlorothieno[3,2-c]-pyridine.

EXAMPLE 30

Bis-4-chloro-7-thiomethylthieno[3,2-c]-pyridine

To a solution of 1.85 g. of 4-chloro-7-ethylxanthylmethylthieno[3,2-c]-pyridine in 40 ml of warm ethanol is added 6 ml. of concentrated ammonium hydroxide. After standing at room temperature for 48 hours, the bis compound is removed by filtration. The product is recrystallized from an alcohol, m.p. 202°–203°C.

What is claimed is:

1. A compound of the formula:

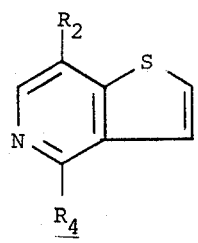

wherein $R_2$ is bromo; and $R_4$ is benzyloxy.

2. A compound of the formula:

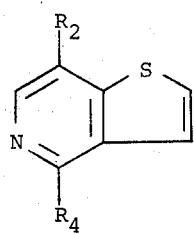

wherein $R_2$ is carboxy; and $R_4$ is halogen.

3. The compound of claim 2 wherein $R_4$ is chloro.

4. A compound of the formula:

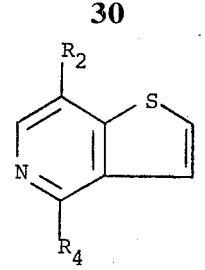

wherein $R_2$ is carbamoyl; and $R_4$ is halogen.

5. The compound of claim 4 wherein $R_4$ is chloro.

6. A compound of the formula:

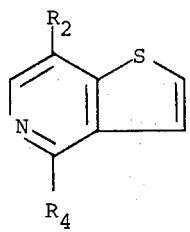

wherein $R_2$ is carbamoyl; and $R_4$ is amino.

7. A compound of the formula:

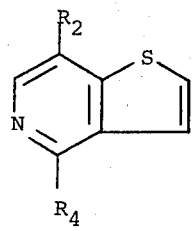

wherein $R_2$ is hydroxymethyl; and $R_4$ is chloro.

* * * * *